United States Patent [19]

Wong

[11] Patent Number: 5,025,080

[45] Date of Patent: Jun. 18, 1991

[54] RESIN COMPOSITION FROM DI(ARYLCYCLOBUTENEALKYL) ETHER OF DI(HYDROXYPHENYL) OLIGOMER

[75] Inventor: Puk K. Wong, Katy, Tex.

[73] Assignee: Shell Oil Company, Houston, Tex.

[21] Appl. No.: 503,413

[22] Filed: Mar. 30, 1990

[51] Int. Cl.$^5$ .............................................. C08G 73/10
[52] U.S. Cl. ..................................... 528/170; 528/86; 528/172; 528/205; 528/210; 528/321; 528/322; 528/422
[58] Field of Search ............... 528/170, 172, 205, 210, 528/322, 321, 422, 86

[56] References Cited

U.S. PATENT DOCUMENTS 4,540,763  9/1985  Kirchhoff ............................ 526/281
4,730,030  3/1988  Hahn et al. ......................... 526/262

Primary Examiner—Harold D. Anderson

[57] ABSTRACT

Improved toughness is demonstrated by cured resin compositions produced by heating a curable resin composition comprising (1) an arylcyclobutenealkyl ether of a di(hydroxyphenyl) oligomer, (2) a bismalemide and (3) a di(cyanatophenyl) oligomer.

15 Claims, No Drawings

RESIN COMPOSITION FROM DI(ARYLCYCLOBUTENEALKYL) ETHER OF DI(HYDROXYPHENYL) OLIGOMER

FIELD OF THE INVENTION

This invention relates to novel curable resin compositions and to cured products produced therefrom. More particularly, the invention relates to compositions comprising an organic dicyanate, a bismaleimide and an ether derived from an arylcyclobutenealkyl compound and a di(hydroxyphenyl) oligomer.

BACKGROUND OF THE INVENTION

The curing of monomeric materials to produce polymeric thermoset resins is well known in the art. In general, the polymerizable monomers have one and customarily more than one reactive group which serves as an active site for a curing or crosslinking polymerization to produce the cured or thermoset resins. Crosslinking of many if not most of the polymerizable monomers requires the use of a second polymerizable monomer, e.g., a stoichiometric curing agent, to cause the curing to occur at an acceptable rate. The stoichiometric curing agent is employed in substantial quantities and will greatly influence the properties of the cured product.

Other polymerizable monomers will cure without the presence of a curing agent and are termed "self-curing." These monomers are also frequently cured with other polymerizable monomers in order to obtain more desirable properties. One class of self-curing monomers contain arylcyclobutene moieties, most frequently benzocyclobutene moieties. It appears likely that such materials undergo, on application of heat, ring opening of the four-membered ring to form very reactive intermediates which crosslink through reaction with adjacent molecules. The arylcyclobutene monomers also undergo reaction with a wide variety of unsaturated species such as maleic anhydride, maleimides, organic cyanates and allyl ethers. The products are thermoset resins having good properties of shelf-life and high use temperatures.

One class of such benzocyclobutene materials is disclosed by a series of U.S. patents to Kirchhoff of which U.S. Pat. No. 4,540,763 is illustrative. The disclosed compounds are characterized by direct linkages from the six-membered ring of the benzocyclobutene through a functional group to the remainder of the molecule. Reaction of such benzocyclobutene derivatives with bismaleimides is shown by Hahn et al, U.S. Pat. No. 4,730,030. A somewhat different class of benzocyclobutene derivatives is shown by copending U.S. patent application Ser. No. 349,546, filed May 9, 1989, wherein the six-membered ring is connected through an alkylene group to the remainder of the molecule. Specifically disclosed and claimed are benzocyclobutenealkyl ethers of bisphenols.

The class of organic dicyanates is a class of reactive polymerizable monomers which typically crosslink to form trimerized cyanurate resins which are highly crosslinked. The thermally cured products have high glass transition temperatures but also exhibit brittleness which renders the cured products unsuitable for some applications. For structural applications the cyanate resins are toughened by blending with up to 50% by weight of thermoplastic engineering thermoplastics as tougheners. However, conventional thermoset processing becomes difficult if not impossible at concentrations of thermoplastic greater than about 20% by weight because of viscosity problems. It would be of advantage to provide an alternate method of toughening cyanate resins.

SUMMARY OF THE INVENTION

The present invention provides improved resin compositions which cure upon application of heat to produce toughened cyanate resins. More particularly, the present invention provides a class of curable resin compositions comprising an organic dicyanate, a bismaleimide and an arylcyclobutenealkyl ether of a di(hydroxyphenyl) oligomer.

DESCRIPTION OF THE INVENTION

The compositions of the invention comprise a cyanate resin of at least two cyanate groups, i.e., —OCN groups, and a toughener system for the cyanate resin formed from an arylcyclobutene ether of a di(hydroxyphenyl) oligomer and a bis(maleimide). The resulting compositions exhibit high glass transition temperatures characteristic of cyanate resins but also demonstrate improved toughness.

The arylcyclobutene-containing component is an ether of a di(hydroxyphenyl) oligomer. As employed herein, the term "oligomer" applies to a low molecular weight material of from 1 unit (a monomer) to a relatively few monomeric units. Although a variety of oligomers having hydroxyphenyl end groups are useful in the compositions of the invention, the preferred di(hydroxyphenyl) oligomers are represented by the formula

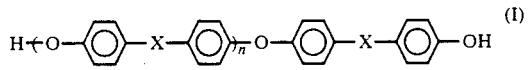 (I)

wherein X independently is a direct valence bond, alkylene of up to 8 carbon atoms inclusive, oxy, thio, sulfonyl, carbonyl or carbonato and n is an average number from 0 to about 20, preferably from 0 to about 10. Within the compounds of the above formula I it is preferred that at least one X group is alkylene such as methylene or 2,2-propylene and the group of alkylene, oxy or sulfonyl linking moieties comprises a preferred group of X moieties. One of the simplest members of the class of compounds of formula I is 2,2-di(4-hydroxyphenyl)propane also known as bisphenol A or BPA. Also preferred are the oligomers wherein at least one monomeric unit is derived from 2,2-di(4-hydroxyphenyl)propane and at least one unit is derived from 2,2-di(4-hydroxyphenyl) sulfone. These oligomers are known compounds or are produced by known methods.

The ether component of the compositions of the invention are arylcyclobutenealkyl ethers of the di(hydroxyphenyl) oligomer of formula I. The ethers are produced by reaction of a metal salt, particularly an alkali metal salt, of the oligomer and an arylcyclobutene alkyl compound of the formula Ar—R—W  (II)

wherein Ar is an arylcyclobutene moiety connected to —RW from a carbon atom of a six-membered ring and R is alkylene of up to 4 carbon atoms inclusive. Suitable W groups in the above formula II are those which, when attached to an aromatic ring are thought to be meta-directing or ring-activating or, expressed differently, are those groups commonly referred to as good "leaving groups" in nucleophilic substitution reactions. Preferred W groups are upper halo, i.e., those halogens other than fluoro (chloro, bromo or iodo), or sulfonic ester groups such as arylsulfonate, e.g., tosylate, brosylate, or nosylate, alkyl sulfonate groups, e.g., mesylate, and fluoroalkyl sulfonate, e.g., triflate or nonaflate. The term "R" of formula II is alkylene of up to 4 carbon atoms inclusive, e.g., methylene, 1,2-ethylene or 1,4-butylene, but preferably is methylene.

The arylcyclobutene group "Ar" is an aromatic ring system of up to 4 aromatic rings and up to 30 carbon atoms inclusive which contains at least one cyclobutene ring fused to a six-membered aromatic ring. Suitable aromatic ring systems are illustrated by a single aromatic ring system compound benzene, the fused aromatic ring system compounds naphthalene, anthracene and phenanthrene, the directly joined aromatic ring system compounds biphenyl and triphenyl and the indirectly joined aromatic ring system compounds of two or more aromatic rings joined by alkylene of up to 8 carbon atoms inclusive such as diphenylalkanes, e.g., diphenylmethane and 2,2-diphenylpropane. The preferred aromatic ring system is the single aromatic ring system compound benzene and the preferred arylcyclobutene moiety is a benzocyclobutene moiety. The Ar moiety is hydrocarbyl containing only atoms of carbon and hydrogen or is substituted hydrocarbyl containing additional atoms as inert carbon atom substituents such as cyano or middle halo. The preferred Ar group is a benzocyclobutene group.

In a preferred embodiment of the ethers of the invention the arylcyclobutenealkyl compound is a halomethylcyclobutene of the formula

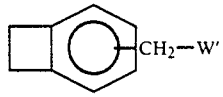
(IIa)

wherein W' is upper halo, i.e., chloro, bromo or iodo, but preferably is chloro or bromo, particularly chloro. The halomethylbenzocyclobutenes are produced by one of several reaction schemes depending upon the desired spatial arrangement of the halomethyl substituent and the cyclobutene ring. A 4-halomethylbenzocyclobutene is prepared from p-methylbenzyl halide, preferably p-methylbenzyl chloride, in two steps by the procedure of Ewing et al, J. Chem. Soc., Chem. Comm., 207 (1979). Preparation of 3-chloromethylbenzocyclobutene is accomplished in a similar manner starting from o-methylbenzyl chloride. In the latter case, however, the procedure yields an about 1:2 molar mixture of 3-chloromethylbenzocyclobutene and 4-chloromethylbenzocyclobutene. This mixture is separated into its individual components by conventional methods such as distillation or chromatographic separation or alternatively is used as such without separation of the isomers. Other arylcyclobutenealkyl compounds are also known compounds or are produced by known methods.

The arylcyclobutenealkyl compound of formula II is reacted with the metal salt of the di(hydroxyphenyl) oligomer. Although other metal salts are useful in the production of the ethers of the compositions of the invention, the preferred metal salts are alkali metal salts and lithium, sodium, potassium, rubidium and cesium salts are satisfactory. Sodium or potassium salts are preferred. In one modification, the alkali metal salt is formed and isolated prior to reaction with the arylcyclobutenealkyl compound. The di(hydroxyphenyl) oligomer is contacted with strong alkali metal base, e.g., alkali metal hydroxide, in aqueous solution at moderate temperatures such as from about 15° C. to about 30° C. Subsequent to reaction the alkali metal salt is isolated by conventional methods such as solvent removal or selective extraction. In a preferred process the alkali metal salt is formed as described above and reacted with the arylcyclobutenealkyl compound in situ. Because of the difficulty of providing a solvent in which both the alkali metal salt and the arylcyclobutenealkyl compound are soluble, the reaction is frequently conducted in a two-phase system employing a first solvent in which the alkali metal salt is soluble, e.g., water, and a second solvent in which the arylcyclobutenealkyl compound is soluble, e.g., toluene or ethylbenzene. Reactant contact is at the interface of the two phases and is facilitated by vigorous stirring or shaking. It is also useful to employ a phase transfer agent such as a tetroalkylammonium salt or a member of the class of macrocyclic polyethers known as "crown ethers". The contacting of the reactants takes place at an elevated temperature, e.g., from about 25° C. to about 150° C. and at a reaction pressure sufficient to maintain the mixture in a non-gaseous state. Subsequent to reaction the arylcyclobutenealkyl ether of the di(hydroxyphenyl) oligomer is recovered by well known methods such as precipitation or solvent removal. By way of specific illustration, the above procedure produces the di(4-benzocyclobutenemethyl) ether of 2,2-bis(4-hydroxyphenyl)propane by interfacial reaction of 4-chloromethylbenzocyclobutene and the sodium salt of 2,2-bis(4-hydroxyphenyl)propane.

The ethers, broadly, are conveniently depicted by removal of the hydroxylic hydrogens of the di(hydroxyphenyl) oligomer and the replacement thereof by arylcyclobutenealkyl groups. In terms of the preferred ether precursors (formulas I and IIa) the ether components are represented by the formula

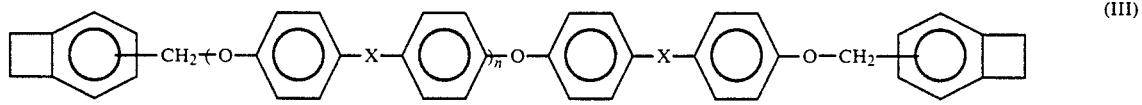
(III)

wherein X and n have the previously stated meanings.

In the compositions of the invention the arylcyclobutenealkyl ether of the di(hydroxyphenyl) oligomer is mixed with a bismaleimide and a dicyanate compound. A wide variety of bismaleimides is useful in the compositions including those described in U.S. Pat. No. 4,730,030, incorporated herein by reference. A preferred class of bismaleimides, however, is represented by the formula

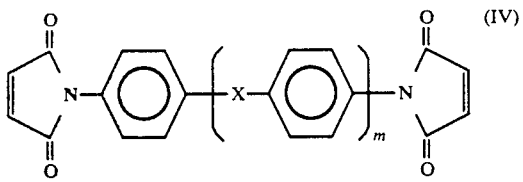

wherein X has the previously stated meaning and m is zero or 1. Such bismaleimides are illustrated by 1,3-di(-maleimido)benzene, bis(4-maleimidophenyl)methane, 2,2-bis(maleimido)propane, bis(4-maleimidophenyl) sulfone, bis(4-maleimidophenyl) ether and bis(4-maleimidophenyl) ketone. The preferred bismaleimides are bis(maleimidophenyl)alkanes and particularly preferred are bis(4-maleimidophenyl)methane and 2,2-bis(4-maleimidophenyl)propane.

A wide variety of dicyanate compounds is also suitable as components of the compositions of the invention. The preferred dicyanate compounds are oligomers represented by the formula

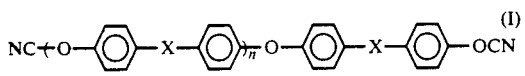

wherein X and n have the previously stated meanings. The nomenclature of such dicyanates is difficult to determine because of the complexity thereof but the simplest member of the series in which X is 2,2-propylene is 2,2-di(4-cyanatophenyl)propane. Other dicyanate compounds will be apparent from the above formula V. The dicyanate compounds are known materials or are produced by known methods. A number of the dicyanato materials are commercially available and some are available mixed with a bismaleimide, e.g., the mixed resin BT-2100 available from Mitsubishi Gas.

The resin compositions are prepared by mixing together the components of the resin composition at moderate to elevated temperatures preferably no higher than about 170° C. The proportions of the components is variable within some limits. The arylcyclobutenealkyl ether of the di(hydroxyphenyl) oligomer is present in an amount from about 20% by weight to about 60% by weight, based on total resin composition, but amounts from about 30% by weight to about 50% by weight on the same basis are preferred. The bismaleimide is suitably present in an amount of from about 5% by weight to about 35% by weight based on total resin composition, preferably from about 5% by weight to about 25% by weight on the same basis. The dicyanato compound is suitably present in an amount of from about 20% by weight to about 80% by weight based on total resin composition with quantities from about 45% by weight to about 55% by weight on the same basis being preferred. The method of mixing the components is not material so long as a homogenous mixture of the components is obtained. A preferred method of mixing comprises melting the components together at an elevated temperature, e.g., at about 150°–160° C.

The resin compositions suitably contain conventional additives for thermosetting resin compositions such as fillers, reinforcements, stabilizers, antioxidants, colorants or dyes designed to improve the processability of the resin composition or modify the properties of the cured product.

The curing of the resin compositions of the invention is accomplished by application of heat. Curing temperatures above about 180° C. are satisfactory although curing temperatures from about 200° C. to about 300° C. are preferred. It is useful on occasion to cure the resin composition in stages as by heating the resin composition to a relatively low curing temperature, e.g., 200°–210° C., and after curing has been initiated raise the curing temperature to a somewhat higher temperature, for example from about 220° C. to about 240° C.

The cured products are characterized by relatively high glass transition temperatures which are phase separated and by improved toughness over cured compositions which do not include the arylcyclobutenealkyl ether component. The compositions are thermosetting resin compositions and are processed by methods conventional for such materials such as extrusion and molding. The cured compositions have good high temperature properties and toughness and are particularly useful where elevated temperature applications are contemplated, for example, in electrical and electronic parts and baseboards.

The invention is illustrated by the following Illustrative Embodiment describing compositions of the invention as well as compositions included for comparative purposes. The data presented should not be regarded as limiting the invention.

ILLUSTRATIVE EMBODIMENT

Compositions containing various resin materials were produced by mixing the indicated components at 150° C. and curing the compositions between glass plates set ⅛-inch apart. Curing was accomplished by heating the compositions at 200° C. for 2 hours and at 220° C. for 6 hours. The properties of the various cured compositions are shown in the Table in terms of the components initially mixed. The components employed are the following.

Component A: Resin BT-2100 marketed by Mitsubishi Gas consisting of 90% 2,2-di(4-cyanatophenyl)-propane and 10% bis(4-maleimidophenyl)methane.

Component B: Bis(4-maleimidophenyl)methane.

Component C: The di(4-benzocyclobutenemethyl) ether of 2,2-di(4-hydroxyphenylpropane.

Component D: The di(4-benzocyclobutenemethyl) ether of

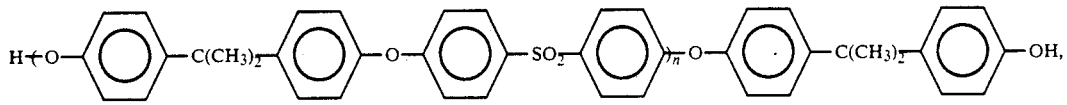

the ether having a number average molecular weight of about 3100.

Component E: A dicyanato compound of the formula

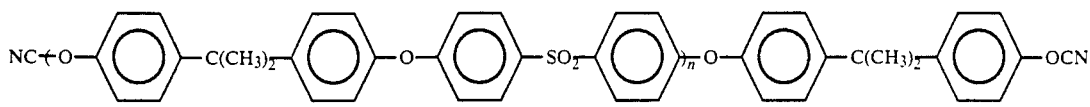

Component E1 has a number average molecular weight of 5000 and Component E2 has a number average molecular weight of 10,000.

TABLE

| Components (phr) | Modulus (KSI) | Tensile Strength (PSI) | Elongation (%) | Kq (PSI in$^{\frac{1}{2}}$) | Tg (°C.) |
|---|---|---|---|---|---|
| A(100) | 503 | 5660 | 1.2 | 531 | 266 |
| A(53) B(17) C(32) | 492 | 9710 | 2.3 | 717 | 220, 253 |
| A(50) D(50) | 672 | 13,800 | 4.2 | 1577 | 197, 279 |
| A(50) E1(50) | — | — | — | 1196 | 237 |
| A(50) E2(50) | — | — | — | 1384 | — |

What is claimed is:

1. A curable resin composition comprising an organic dicyanate, a bismaleimide and a di(arylcyclobutenealkyl) ether of di(hydroxyphenyl) oligmer of the formula

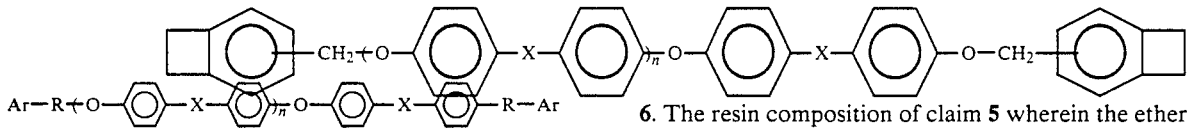

wherein Ar is an aromatic ring system of up to 4 aromatic rings and up to 30 carbon atoms inclusive connected to R from a carbon atom of a six-membered ring, R is alkylene of up to 4 carbon atoms inclusive, X is a direct valence bond or X is alkylene of up to 8 carbon atoms inclusive, oxy, thio, sulfonyl, carbonyl or carbonato and n is an average number from 0 to about 20.

2. The resin composition of claim 1 wherein the di(arylcyclobutenealkyl) ether is a di(benzocyclobutenealkyl) ether.

3. The resin composition of claim 2 wherein the bismaleimide is the dismaleimide of the formula

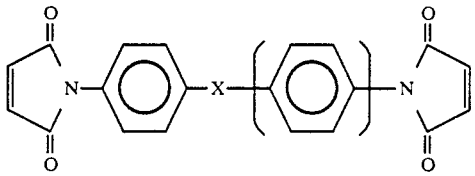

wherein X is a direct valence bond or X is alkylene of up to 8 carbon atoms inclusive, oxy, thio, sulfonyl, carbonyl or carbonato and m is zero or 1.

4. The resin composition of claim 3 wherein the dicyanato compound is represented by the formula

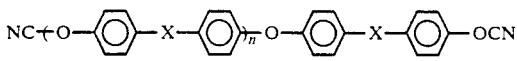

wherein n is an average number from 0 to 20 and X is a direct valence bond or X is alkylene of up to 8 carbon atoms inclusive, oxy, thio, sulfonyl, carbonyl or carbonato.

5. The resin composition of claim 4 wherein the ether is represented by the formula 6. The resin composition of claim 5 wherein the ether is present in a quantity of from about 20% by weight to about 60% by weight based on total resin composition.

7. The resin composition of claim 6 wherein the bismaleimide is present in a quantity from about 5% by weight to about 35% by weight based on total resin composition.

8. The resin composition of claim 7 wherein the dicyanate is present in a quantity from about 40% by weight to about 60% by weight based on total resin composition.

9. The resin composition of claim 8 wherein the bismaleimide is bis(4-maleimidophenyl)methane.

10. The resin composition of claim 9 wherein the dicyanate compound is 2,2-di(4-cyanatophenyl)propane.

11. The resin composition of claim 10 wherein the ether is the di(4-benzocyclobutenemethyl) ether of 2,2-di(4-hydroxyphenyl)propane.

12. The resin composition of claim 10 wherein the ether is the di(4-benzocyclobutenemethyl ether of

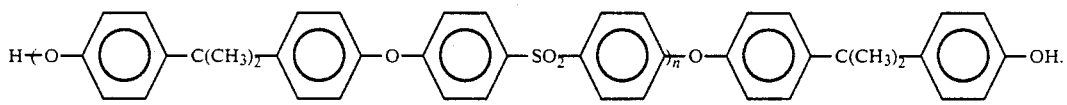

13. The cured resin composition produced by heating the composition of claim 1 to a temperature above about 180° C.

14. The cured resin composition produced by heating the composition of claim 11 to a temperature above about 180° C.

15. The cured resin composition produced by heating the composition of claim 12 to a temperature above about 180° C.

* * * * *